(12) United States Patent
McMillan

(10) Patent No.: US 9,140,131 B2
(45) Date of Patent: Sep. 22, 2015

(54) METHODS FOR CONTROLLING FRICTION BETWEEN HETEROGENEOUS CONTACT SURFACES

(75) Inventor: Alison J McMillan, Uttoxeter (GB)

(73) Assignee: ROLLS-ROYCE plc, London (GB)

(*) Notice: Subject to any disclaimer, the term of this patent is extended or adjusted under 35 U.S.C. 154(b) by 794 days.

(21) Appl. No.: 13/445,278

(22) Filed: Apr. 12, 2012

(65) Prior Publication Data

US 2012/0269637 A1   Oct. 25, 2012

(30) Foreign Application Priority Data

Apr. 19, 2011   (GB) .................. 1106546.3

(51) Int. Cl.
| | | |
|---|---|---|
| *F01D 5/30* | (2006.01) | |
| *B23P 9/00* | (2006.01) | |
| *B24B 19/14* | (2006.01) | |
| *B24B 15/08* | (2006.01) | |
| *B24B 19/06* | (2006.01) | |

(52) U.S. Cl.
CPC ............. *F01D 5/3007* (2013.01); *B23P 9/00* (2013.01); *B24B 15/08* (2013.01); *B24B 19/06* (2013.01); *B24B 19/14* (2013.01); *F05D 2230/90* (2013.01); *F05D 2250/621* (2013.01); *F05D 2260/941* (2013.01); *F05D 2300/702* (2013.01); *Y10T 29/49316* (2015.01); *Y10T 29/49336* (2015.01)

(58) Field of Classification Search
CPC ....... F01D 5/3007; B24B 19/06; B24B 19/14; B24B 15/08; B24B 21/16; B24B 21/165; B23P 9/00; B23P 13/00; B23P 13/02; B23P 13/04; Y10T 29/49316; Y10T 29/49366; F05D 2250/621; F05D 2260/941; F05D 2300/702; F05D 2230/90

See application file for complete search history.

(56) References Cited

U.S. PATENT DOCUMENTS

| | | | |
|---|---|---|---|
| 3,330,634 A | | 7/1967 | Rae et al. |
| 3,891,351 A | * | 6/1975 | Norbut ................ 416/219 R |
| 2013/0219856 A1 | * | 8/2013 | Suciu et al. ................ 60/226.1 |

FOREIGN PATENT DOCUMENTS

| | | | |
|---|---|---|---|
| GB | 913093 | * | 2/1961 |
| GB | 913093 | | 12/1962 |

OTHER PUBLICATIONS

British Search Report dated Aug. 16, 2011 issued in British Patent Application No. 1106546.3.

* cited by examiner

*Primary Examiner* — David Bryant
*Assistant Examiner* — Lee A Holly
(74) *Attorney, Agent, or Firm* — Oliff PLC

(57) ABSTRACT

A method of conditioning a first, heterogeneous contact surface for operational engagement with a second contact surface, the method comprising: performing a smoothing operation on part or all of the first contact surface while subjecting said part or all of the first contact surface respectively to a contact pre-stress corresponding to a nominal operational contact stress between the first and second contact surfaces.

8 Claims, 4 Drawing Sheets

METHODS FOR CONTROLLING FRICTION BETWEEN HETEROGENEOUS CONTACT SURFACES

The present invention relates to a method of conditioning one or both of a pair of load-bearing contact surfaces for a given operational use, one or both of which surfaces are heterogeneous. The invention may be used for any load-bearing contact surfaces, and is particularly concerned with applications where it is advantageous that the contact surfaces are smooth.

There are many instances where it is desirable to ensure that load bearing contact surfaces on a first and second component are as smooth as possible, typically in order to reduce frictional wear between the contact surfaces. Examples include a gas turbine blade root located in a respective disc slot, rollers or ball bearings arranged in between bearing races, splined connections, curvic joints etc.

Typically, the contact surfaces are prepared by carrying out some sort of conventional smoothing operation. For example, the surfaces may be machined and/or polished to remove any asperities on the contact surfaces.

In the majority of cases, at least one of the contact surfaces (and often both) will have a heterogeneous structure. In polycrystalline solids such as metals, for example, heterogeneity will typically result from differential crystal size, orientation and phase within the structure of the solid.

It has been found in accordance with the present invention that, in certain cases, material heterogeneity can have a significant impact upon frictional wear between the load bearing contact surfaces. This is because the material heterogeneity gives rise to a differential stress response across the respective contact surface (or across at least part of the contact surface) which in turn can tend to "roughen" the contact surface, increasing the coefficient of friction between the contact surfaces.

It is an object of the present invention to seek to provide a method of conditioning a first, heterogeneous contact surface for operational engagement with a second contact surface, for controlling the operational friction between the contact surfaces.

According to the present invention there is provided a method of conditioning a first, heterogeneous contact surface for operational engagement with a second contact surface, the method comprising: performing a smoothing operation on part or all of the first contact surface whilst subjecting said part or all of the first contact surface respectively to a contact pre-stress corresponding to a nominal operational contact stress between the first and second contact surfaces.

The contact pre-stress may be controlled, across at least part of the first contact surface, in accordance with a nominal operational contact stress distribution across the first and second contact surfaces.

The contact pre-stress may be applied in at least a peripheral region of the contact surfaces and correspond to the nominal operational contact stress between the first and second contact surfaces, in said peripheral region.

The smoothing operation may comprise polishing the contact surface. Polishing may be in the form high pressure polishing for both smoothing the contact surface and at the same time applying said contact pre-stress to the contact surface.

The smoothing operation may additionally or alternatively comprise machining the contact surface.

The contact surfaces themselves may each form part of a respective component in a gas turbine. In particular, the first contact surface may be part of a gas turbine blade, in particular part of the blade root, and the second contact surface may be part of a respective mounting disc for the blade, in particular part of a retaining slot for the blade root which is formed in the mounting disc.

According to another aspect of the invention, there is provided a component having a contact surface prepared in accordance with the invention.

Embodiments of the invention will now be described by way of example, with reference to the accompanying drawings, in which.

Figure 1:
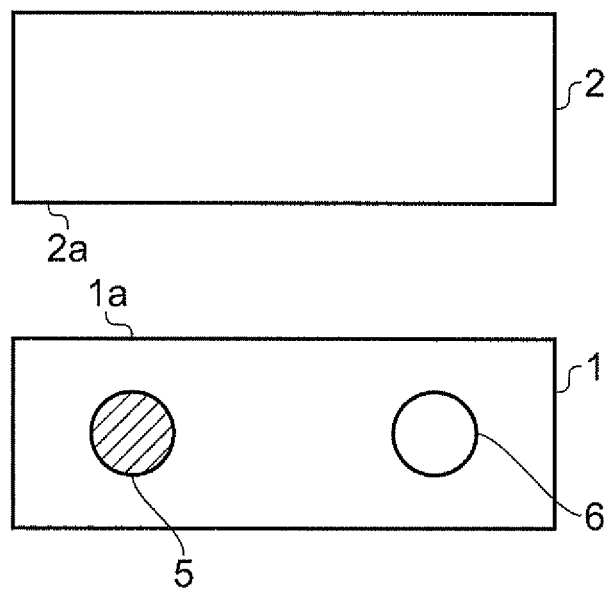
FIG. 1 is a very schematic, cross-sectional illustration showing a pair of components.

FIG. 1 shows a first component 1 and a second component 2 which are configured to engage with one another across respective load-bearing contact surfaces 1a and 2a.

Figure 2:
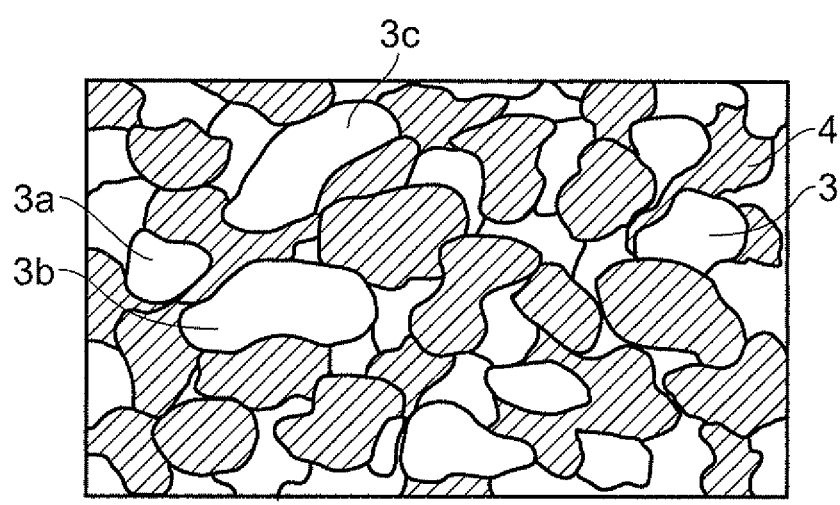
FIG. 2 is a magnified, schematic cross-section through a typical metal component, intended to illustrate the heterogeneous structure of the component.

The first component 1 (and hence the respective contact surface 1a) is formed from a heterogeneous material. For example, the first component 1 may be a metal component having the polycrystalline structure illustrated very schematically in FIG. 2. Here, material heterogeneity arises from inclusion of different crystal phases 3 and 4, differential crystal size between the grains (c.f. crystal grains 3a and 3b) and variable crystal orientation throughout the structure (c.f. crystal grains 3b and 3c).

Ideally, the load bearing contact surfaces 1a and 2a will be perfectly smooth, thereby eliminating frictional wear between the surfaces 1a, 2a. In reality, the contact surfaces 1a and 2a will inevitably not be perfectly smooth and the level of any frictional wear will be related to the roughness of each of the contact surfaces 1a and 2a.

Figure 3:
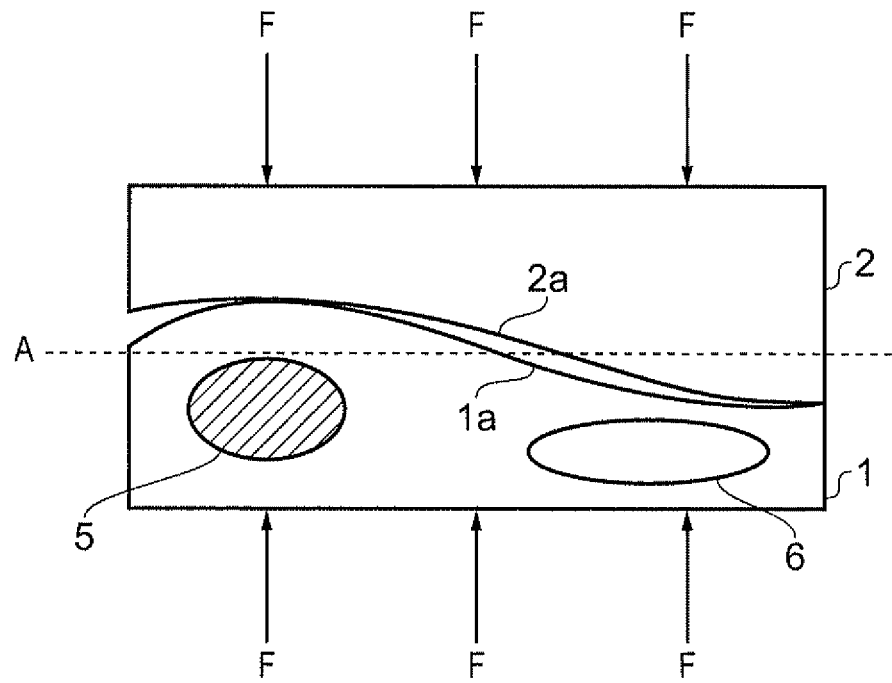
FIG. 3 is schematic, cross-sectional illustration corresponding to FIG. 1, showing the components in operational engagement with one another.

In the case of contact surface 1a, the surface roughness may be affected by the material heterogeneity of the component 1, as illustrated in FIG. 3. For the sake of clarity, the material heterogeneity of component 1 is represented very schematically by a first localised region 5 having a relatively high Poisson's ratio and a localised region 6 having a relatively low Poisson's ratio.

In FIG. 1, the components 1, 2 are shown disengaged from one another with the respective contact surfaces 1a and 2a not being subject to any external contact stress. Here, the contact 1a is relatively smooth.

In FIG. 3, the components 1, 2 are shown in engagement with the one another under a contact stress F (i.e. a stress having a component which is directed along the normal to the contact surfaces 1a, 2a). Here, each of the localised regions 5, 6 undergoes a degree of compression under the contact stress F. The degree of compression will, however, vary between the localised regions 5, 6 in accordance with the respective Poisson's ratio for each region 5, 6. As a result, the roughness of the contact surface 1a increases under the contact stress F (c.f. axis A and contact surface 1a in FIG. 3) which increases the coefficient of friction μ. Consequently, frictional wear between the contact surface 1a and the contact surface 2a will occur at a faster rate.

In accordance with the present invention, frictional wear of contact surfaces 1a, 2a under contact stress F is limited or reduced (i.e. "controlled") by initially carrying out a smoothing operation on the contact surface 1a whilst subjecting the contact surface 1a to a contact pre-stress $F_{pre\text{-}stress}$ corresponding to the contact stress F. The procedure is illustrated schematically in FIG. 4, which shows the initial, relatively rough contact surface 1a in solid line and the resulting, relatively smooth profile of the contact surface 1a in "phantom". It will be appreciated that as more material is removed by the smoothing operation in the proximity of the localised region 5 than is removed in proximity to the localised region 6, the profile of the contact surface 1a will actually be relatively rough or contoured when the transverse contact stress $F_{pre\text{-}stress}$ is removed (see FIG. 5); however, the contact surface 1a will nevertheless adopt a relatively smooth profile once it is brought into engagement with the contact surface 2a on component 2 under the contact stress F (corresponding to the contact pre-stress, $F_{pre\text{-}stress}$).

Figure 4:
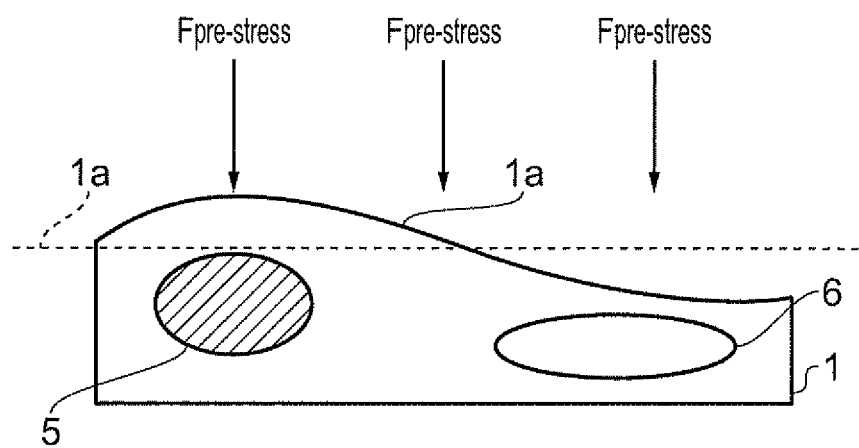
FIG. 4 is a schematic, cross-sectional view showing one of the components in FIG. 3 in isolation under a contact pre-stress prior to a smoothing operation.
Figure 5:
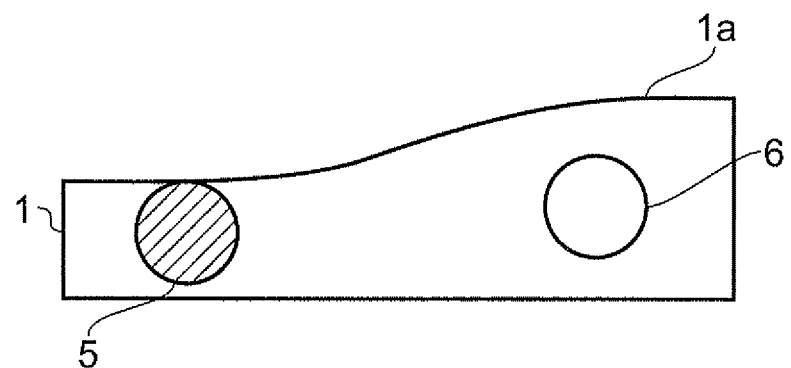
FIG. 5 is a schematic, cross-sectional view showing the component in FIG. 4 following the smoothing operation and subsequent removal of the contact pre-stress.
Figure 6:
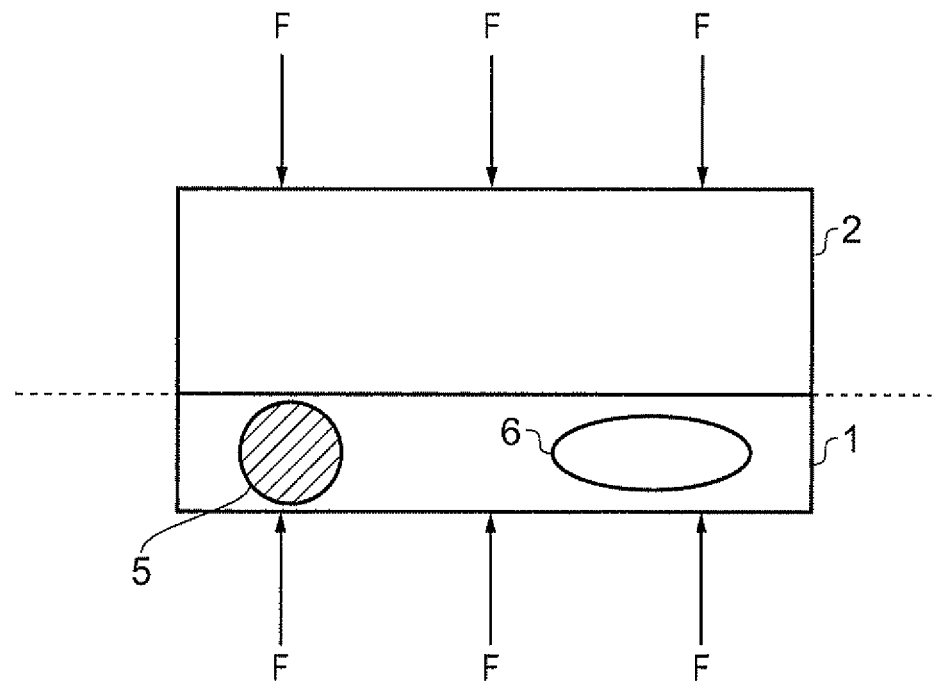
FIG. 6 is a schematic, cross-sectional view showing the component of FIG. 5 in operational engagement with the other respective component initially illustrated in FIG. 1.

The smoothing operation may be any suitable operation and may include machining and/or polishing the contact surface 1a. Similarly, the contact pre-stress $F_{pre\text{-}stress}$ may be applied in any suitable manner; for example, high pressure polishing may be used both to smooth the contact surface 1a whilst applying the contact pre-stress $F_{pre\text{-}stress}$. It will be appreciated that, in FIG. 4, the peak-to-trough amplitude of the roughness of the contact surface 1a has been greatly exaggerated; in practice, removal of material to smooth the contact surface 1a as shown in FIG. 4 will not appreciably reduce the thickness of the component 1.

The invention may apply generally to all manner of components.

Figure 7:
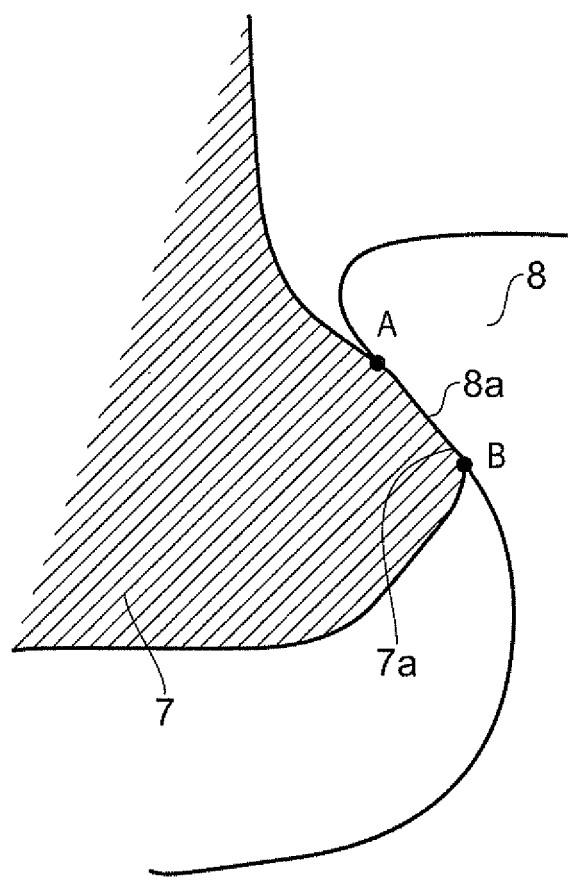
FIG. 7 is a simplified cross-sectional view showing part of a gas turbine blade located in a respective retaining slot formed on a mounting disc for the gas turbine blade.
Figure 8:
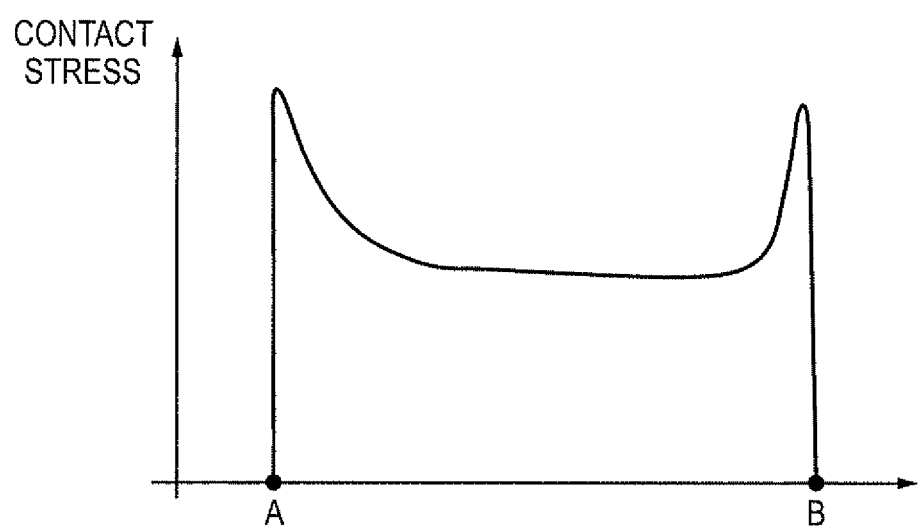
FIG. 8 illustrates a contact stress profile across the contact surfaces on the blade and slot in FIG. 7.

In the case of certain components, the respective contact surfaces may not be subject to a uniform transverse contact stress. For example, FIG. 7 shows a gas turbine blade engaged in a mounting slot in a corresponding mounting disc (only part of the mounting disc and gas turbine blade are illustrated in FIG. 7). FIG. 8 shows the transverse contact stress profile across the respective contact surfaces 7a and 8a (i.e. between the points A and B in FIG. 7). The contact stress profile is generally uniform across the transverse width of the contact surfaces 7a and 8a but exhibits corresponding "spikes" in the contact stress along the peripheral edges of the contact regions 7a and 8a.

In cases where the contact stress is not uniform across the contact surfaces, the contact pre-stress $F_{pre\text{-}stress}$ may be controlled accordingly to reflect variations in the nominal contact stress across the contact surfaces.

The contact pre-stress $F_{pre\text{-}stress}$ may be applied to only part of the relevant contact surface, for example the peripheral regions of the contact surfaces 7a and 8a in FIG. 7 (which tend to be particularly vulnerable to fretting fatigue caused by frictional wear). It will be appreciated here that the parts of the relevant contact surface which have not been smoothed under a suitable contact pre-stress may then be relatively rough under a corresponding operational stress, but this may be tolerable in certain regions which are not as vulnerable to frictional wear and/or where frictional wear is not likely to lead to any critical failure.

The invention claimed is:

1. A method of conditioning a first, heterogeneous contact surface for operational engagement with a second contact surface, the method comprising: performing a smoothing operation on part or all of the first contact surface whilst subjecting said part or all of the first contact surface respectively to a contact pre-stress acting directly on the part or all of the first contact surface on which the smoothing operation is being performed, the contact pre-stress corresponding to a nominal operational contact stress between the first and second contact surfaces.

2. A method according to claim 1, wherein the contact pre-stress is controlled, across at least part of the first contact surface, in accordance with a nominal operational contact stress distribution across the first and second contact surfaces.

3. A method according to claim 1, wherein the contact pre-stress is applied in at least a peripheral region of the contact surfaces and corresponds to the nominal operational contact stress between the first and second contact surfaces, in said peripheral region.

4. A method according to claim 1, wherein the smoothing operation comprises polishing the contact surface.

5. A method according to claim 4, wherein the said polishing is high pressure polishing for both smoothing the contact surface and at the same time applying said contact pre-stress to the contact surface.

6. A method according to claim 1, wherein the smoothing operation comprises machining the contact surface.

7. A method according to claim 1, wherein the contact surfaces each form part of a respective component in a gas turbine.

8. A method according to claim 1, wherein the first contact surface is part of a gas turbine blade and the second contact surface is part of a mounting disc for the gas turbine blade.

* * * * *